United States Patent [19]

Egan

[11] Patent Number: 4,564,853

[45] Date of Patent: Jan. 14, 1986

[54] ELECTRONIC IMAGE SENSING AND PRINTING APPARATUS

[75] Inventor: Richard G. Egan, Dover, Mass.

[73] Assignee: Polaroid Corporation, Cambridge, Mass.

[21] Appl. No.: 699,564

[22] Filed: Feb. 8, 1985

[51] Int. Cl.⁴ ............................................. G01D 9/42
[52] U.S. Cl. .................................. 346/160; 358/302; 358/293; 346/108
[58] Field of Search ............... 358/285, 293, 300, 302; 346/160, 107, 108; 365/110; 350/6.7, 6.8, 361

[56] References Cited

U.S. PATENT DOCUMENTS 4,490,608 12/1985 Yeadon et al. ..................... 358/293
4,535,342 8/1985 Ohara et al. ........................ 346/160

OTHER PUBLICATIONS

"A Semiconductor Laser Addressed Dye Doped Liquid Crystal Light Valve" by Tetsuo Urabe, Hiroya Usui, Kunihiko Arai, Akio Ohkoshi Development Center, Sony Corporation, Tokyo, see entire article.

Primary Examiner—E. A. Goldberg
Assistant Examiner—A. Evans
Attorney, Agent, or Firm—Edward S. Roman

[57] ABSTRACT

An electronic image printing apparatus of the type utilizing a laser addressed liquid crystal light valve includes a single set of XY scanning galvanometer mirrors which operate initially to line scan an original photograph in order to derive electronic image data therefrom. The XY scanning galvanometer mirrors subsequently operate to addressably line scan a laser beam which is modulated in response to the electronic image data, across the surface of the liquid crystal light valve and to thereafter reflect a beam of incoherent light from a projection lamp for transmission through the liquid crystal light valve to expose a photosensitive material and thereby reproduce the image previously line scanned from the original photograph.

13 Claims, 5 Drawing Figures

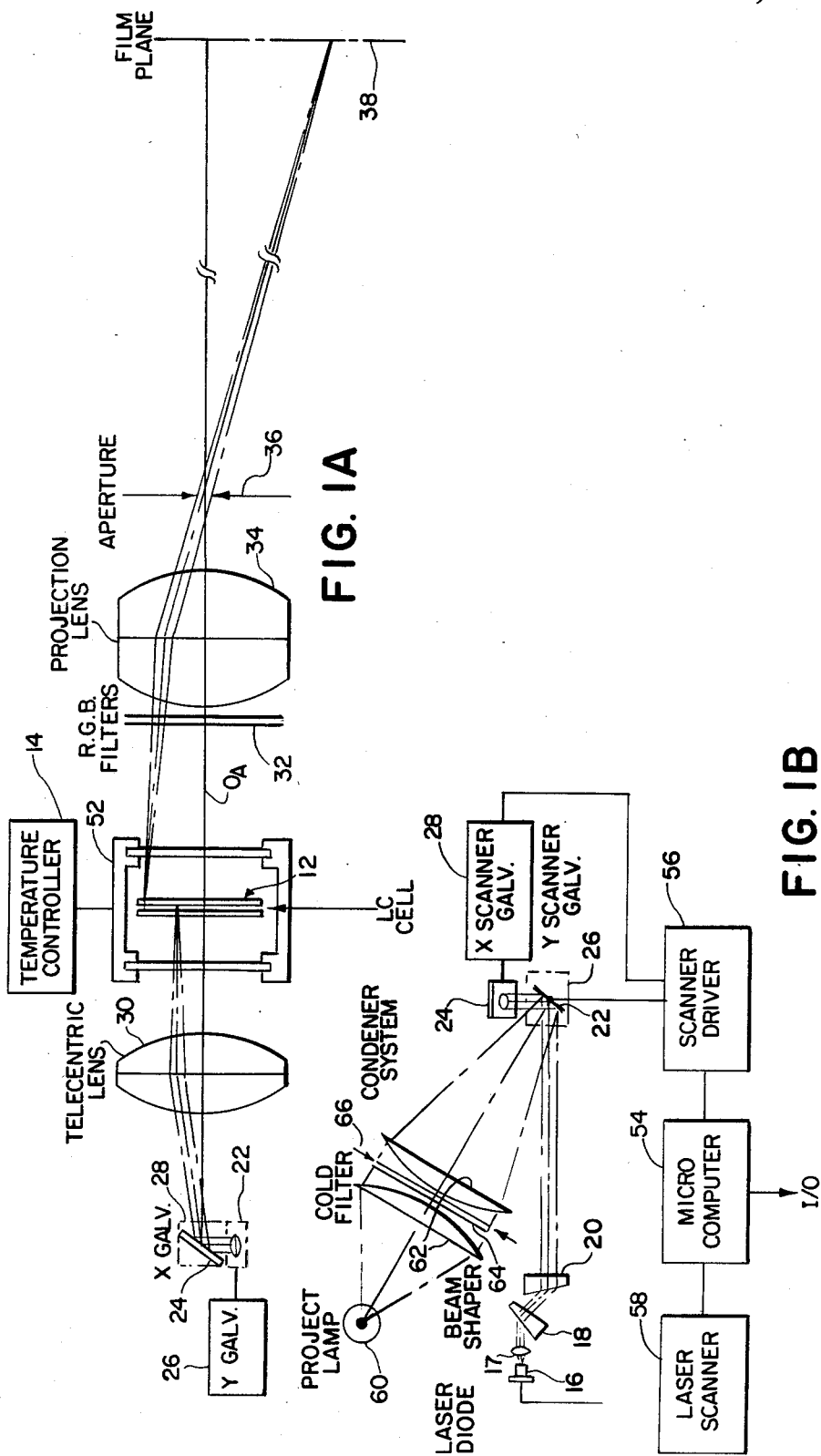

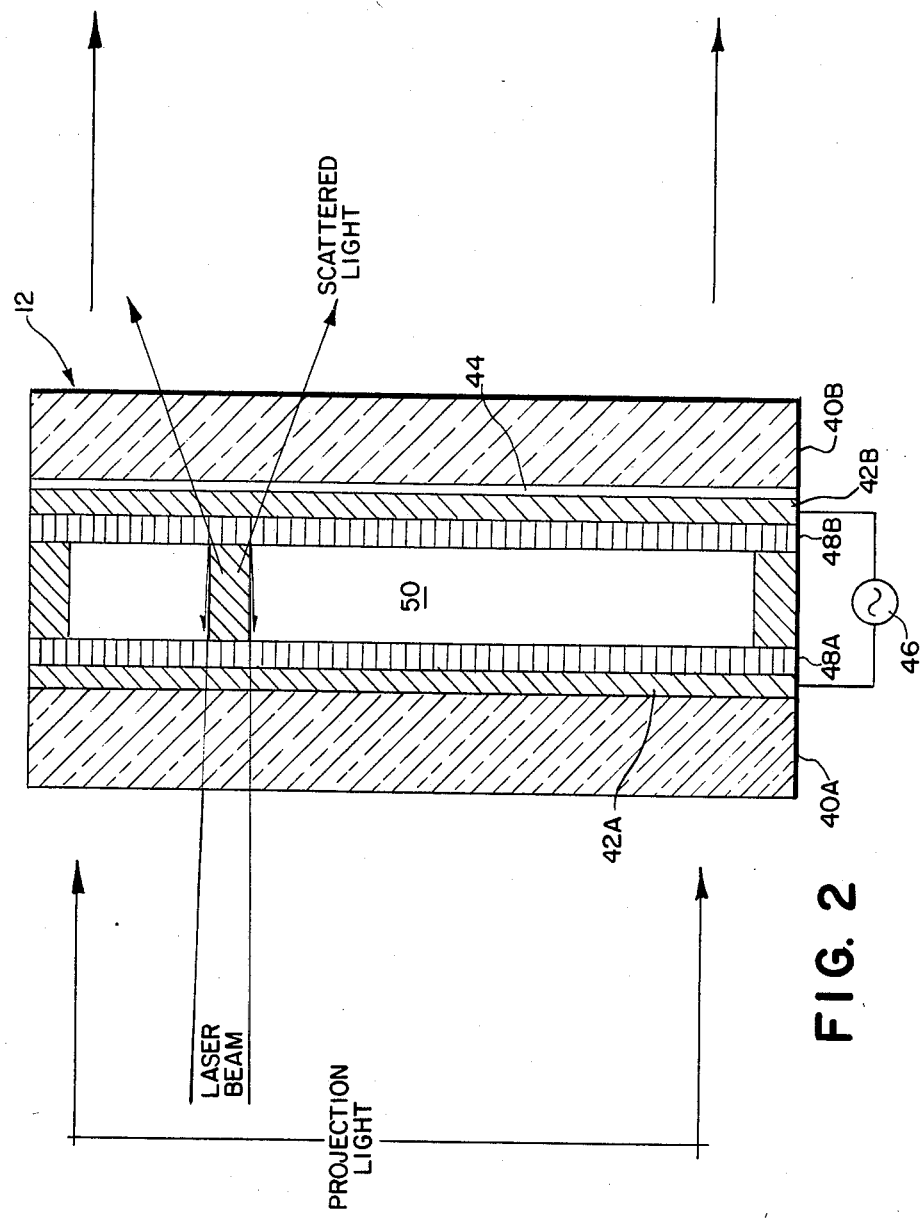

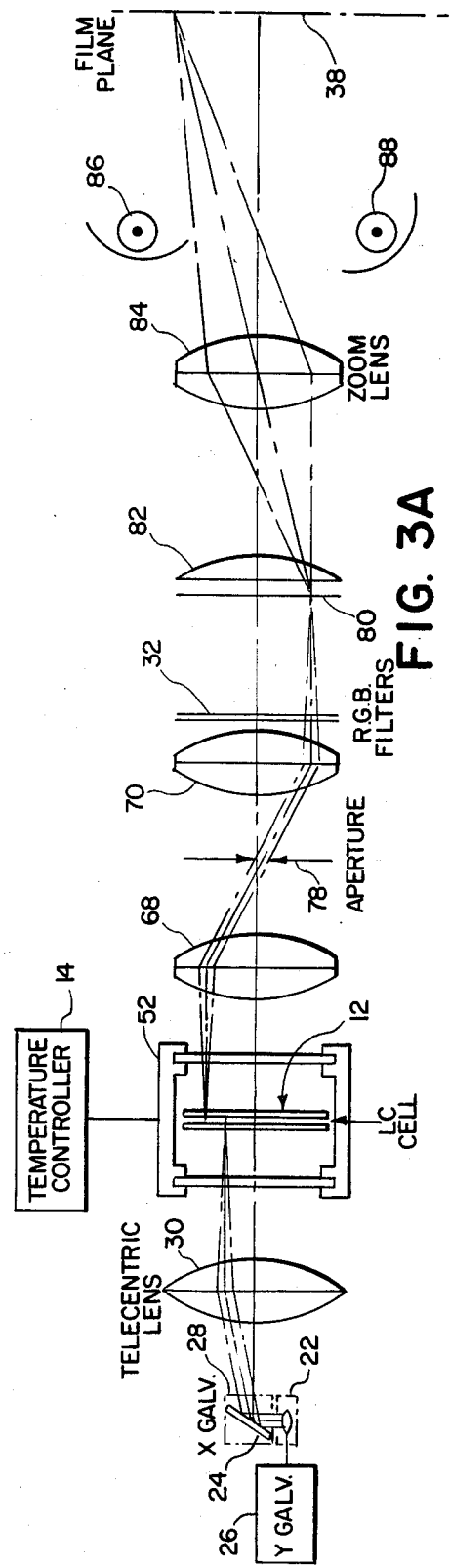
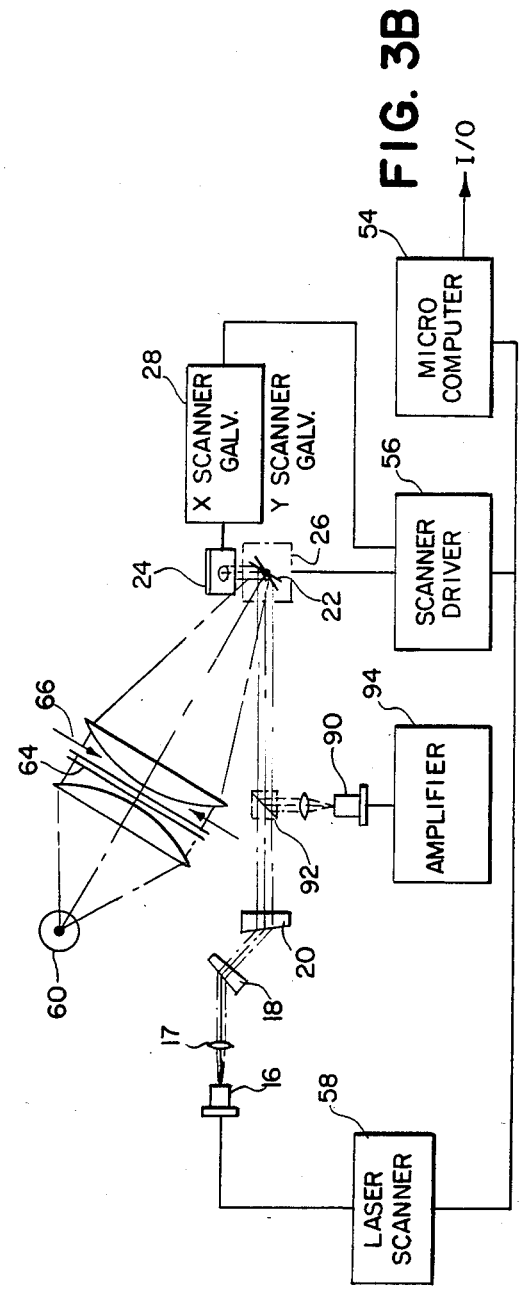
FIG. 3A
FIG. 3B

ELECTRONIC IMAGE SENSING AND PRINTING APPARATUS

BACKGROUND OF THE INVENTION

1. Field of the Invention

This invention relates generally to an electronic image printing apparatus and, more particularly, to an electronic image printing apparatus in which the same scanning optics that laser address a liquid crystal light valve also subsequently project film exposing illumination through the addressed light valve.

2. Description of the Prior Art

Electronic image printing apparatus of the type using a laser addressed liquid crystal light valve addressed by a laser diode are known in the art. One such electronic image printing apparatus reported by Sony utilizes a laser addressed liquid crystal light valve doped with a squarylium IR absorbing dye in cyanononyl biphenyl in concentrations of up to 0.4 wt percent. Such laser addressed liquid crystal light valves have been matched with semi-conductor lasers using a 10 milliwatt Ga-Al-Ar laser of 780 nanometer lasing wavelength. The laser beam is deflected in the XY directions by galvanometer meters and thereafter focused onto the liquid crystal light valve by a suitable focusing lens. The galvanometers operate to scan the laser beam across the area of the liquid crystal light valve whereupon the laser energy is absorbed by the IR dye and transformed into heat to cause smectic A-nematic isotropic phase transition of the liquid crystal molecules. This isotropic state of the liquid crystal molecules possesses a randomly oriented order which operates to scatter light and thus show a dark image when the light valve is illuminated for projection onto a photosensitive surface. The liquid crystal light valve is ordinarily maintained at a constant temperature in a temperature chamber a few degrees below the smectic A-nematic phase transition temperature thus insuring that the liquid crystal molecules do not realign until deliberately erased upon the application of an AC bias across the liquid crystal.

The aforementioned electronic image printing apparatus disclosed by Sony operates to uniformly illuminate the liquid crystal light valve from the side opposite to which it is previously addressed by the laser beam resulting in the light valve reflecting the uniform illumination through an appropriate projection lens to expose a photosensitive material. Operating the liquid crystal light valve in this reflection mode, however, limits the contrast ratio which could otherwise be achieved were the liquid crystal light valve operated in a transmission mode. Projecting a beam of incoherent light to uniformly illuminate the liquid crystal light valve in the aforementioned transmission mode after it is laser addressed presents other difficulties resulting from the injection of a dichroic beam splitter in the light path between the galvanometer mirrors and the liquid crystal light valve. The dichroic beam splitter positioned in this manner inhibits the galvanometer mirrors from being used to line scan an existent photograph to derive electronic image data therefrom which may be subsequently utilized to provide an enhanced image reproduction thereof.

Therefore, it is a primary object of this invention to provide an electronic image printing apparatus having a single set of XY scanning galvanometer mirrors which may be utilized to line scan an original photograph to derive image data therefrom and thereafter utilized to addressably line scan a laser beam across the face of a liquid crystal light valve.

It is a further object of this invention to provide an electronic image printing apparatus in which a single pair of XY scanning galvanometer mirrors are utilized to addressably line scan a liquid crystal light valve and to reflect a beam of incoherent light from a projection lamp to the light valve.

It is an even further object of this invention to provide an electronic image printing apparatus having a single set of XY scanning galvanometer mirrors for scanning an original photograph in order to derive image data therefrom, for subsequently addressably line scanning a laser beam across the surface of a liquid crystal light valve, and for thereafter reflecting a beam of incoherent light from a projection lamp for transmission and modulation by the light valve to ultimately expose a photocopy of the original line scanned photograph.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An electronic image printer of the type adapted to expose a photosensitive material with light derived from a source of incoherent light to print an image on the photosensitive material of a selected subject comprises laser means for providing a beam of coherent light. Means are provided for modulating the coherent light beam in response to an electronic signal corresponding to the image of the subject selected for printing. There is also provided a laser addressed liquid crystal light valve together with light scanning means including at least one reflective scanning surface for sweeping the modulated coherent light beam over the area of the liquid crystal valve so as to address the liquid crystal light valve. First optical means are provided for focusing the light emanating from the source of incoherent light to the light reflective scanning surface for projection by the light scanning surface to uniformly illuminate the area of the liquid crystal light valve previously addressed by the beam of coherent light. Second optical means are provided for directing the incoherent light transmitted through the liquid crystal light valve to expose the photosensitive material to the image of the subject selected for printing.

The light scanning means preferably comprises two light reflective scanning surfaces for sweeping the coherent light beam in mutually orthogonal directions. One of the light reflective scanning surfaces operates to reflect the coherent light beam to the other of the reflective scanning surfaces from whence the coherent light beam is reflected to the liquid crystal light valve. The first optical means operates to focus the light emanating from the source of incoherent light to the other reflective scanning surface.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1A is a schematic block diagram showing a portion of the electronic image printing apparatus of this invention;

FIG. 1B is a schematic block diagram showing the remaining portion of the electronic image printing apparatus of FIG. 1A;

FIG. 2 is an enlarged side elevational view of a laser addressed liquid crystal light valve used in the electronic image printing apparatus of FIGS. 1A and 1B;

FIG. 3A is a schematic block diagram showing a portion of an alternate embodiment for the electronic image printing apparatus of this invention; and FIG. 3B is a schematic block diagram showing the remaining portion of the electronic image printing apparatus of FIG. 3A.

DESCRIPTION OF THE PREFERRED EMBODIMENT

Referring now to FIGS. 1A and 1B, there is shown a block diagram for the electronic image color film printing apparatus of this invention comprising a laser addressed liquid crystal light valve 12 (LALCLV) as shown in FIG. 1A which is addressed from a Ga-Al-As laser diode 16 as shown in FIG. 1B. The output light beam from the Ga-Al-As laser diode 16 is collimated by a collection lens 17 and thereafter appropriately shaped by a pair of optical prisms 18 and 20. The laser light beam emanating from the last of the beam shaping prisms 20 thereafter impinges upon a Y scanning mirror 22 from whence it is reflected to an X scanning mirror 24. The Y scanning mirror 22 is appropriately deflected in a well-known manner to affect a Y axis raster scan by a Y scanning galvanometer 26 while the X scanning mirror 24 is also appropriately deflected to affect an X axis raster scan by an X scanning galvanometer 28. The laser beam is reflected by the X scanning mirror 24 to a telecentric lens 30 from whence it is focused to a spot of 40 micrometers or less on the laser addressed liquid crystal light valve 12.

Incoherent light which is thereafter projected through the laser addressed liquid crystal light valve 12 in the manner of this invention to be subsequently described herein thereafter passes through one of a plurality of red, green and blue light filtering elements stationed in circumferentially spaced apart relation on a rotatable filter wheel as shown generally at 32. A standard projection lens arrangement as shown generally at 34 operates to image the incoherent light projected through the laser addressed liquid crystal light valve 12 and subsequently transmitted through one of the aforementioned red, green and blue filter elements in the filter wheel 32, through an aperture defining plate 36 and onto a film plane 38.

Projection illumination is provided from a source 60 of incoherent white light such as a halogen lamp or a pulsed xenon lamp. A condenser lens system comprising a pair of plano convex lenses 62 condenses the light from the projection source 60 so as to focus the light at the plane of the X scanning mirror 24. Intermediate the pair of plano convex lenses 62 there is provided a shutter 66 and a cold filter 64.

A microcomputer 54 responds to an electronic image data input signal which may be either in analog or digital format and represents a selected image to be recorded in the manner of this invention on a photosensitive material stationed at the film plane 38. The image data is serially transmitted to a laser driver circuit 58 for modulating the output intensity of the Ga-Al-As laser diode 16 in a well known manner. The image data is also fed to a scanner driver circuit 56 to control the Y and X scanning galvanometers 26 and 28 in a well-known manner.

Referring now to FIG. 2, there is shown an enlarged cross-sectional view of the laser addressed liquid crystal light valve 12 comprising two substantially parallel spaced apart glass substrates 40A and 40B. The inside surface of the glass substrate 40A is coated with an indium tin oxide (ITO) transparent electrode 42A. The inside surface of the glass substrate 40B is overlaid with a cold filter 44 on top of which is deposited another indium tin oxide (ITO) transparent electrode 42B. The inside surfaces of the indium tin oxide transparent electrodes 42A and 42B are in respective juxtaposed relation with two spaced apart substantially parallel aligning layers 48A and 48B. Intermediate the spaced apart aligning layers 48A and 48B, there are provided smectic liquid crystals 50 such as cyanononyl biphenyl. The liquid crystal is preferably doped with an IR laser absorbing dye such as squarylium at concentrations up to 0.4 wt %. The absorption maximum of the squarylium dye at 780 nanometers provides a match with the Ga-Al-As laser diode 16 while only having weak absorption in the visible spectrum. The laser addressed liquid crystal light valve 12 is preferably held at a constant temperature in a temperature chamber 52 as shown in FIG. 1A wherein the temperature is typically maintained in the order of 40 degrees Centigrade by a temperature controller 14.

Operation of the electronic image color film printer of this invention proceeds as follows. Image data received by the microcomputer 54 from any well-known source such as a magnetic tape or disc is thereafter directed by way of the laser driver 58 to modulate the intensity of the output laser beam from the Ga-Al-As laser diode 16. The image data received by the microcomputer 54 is also directed by way of the scanner driver 56 to drive the Y, X galvanometers 26, 28 which deflect the Y, X scanning mirrors 22, 24 in the aforementioned manner to provide a two-dimensional line scan of the laser beam across the surface of the liquid crystal light valve 12 so as to fully address the light valve 12. The energy from the laser beam is absorbed by the IR absorbing squarylium dye and transformed into heat to cause smectic A-nematic isotropic phase transition of the liquid crystal molecules. The liquid crystal molecules in this isotropic state possess a randomly oriented order which does not realign when the liquid crystal molecules are rapidly cooled. Thus, there is maintained a highly scattered state in those areas addressed or heated by the laser beam which project a dark image when the cell is illuminated onto the film plane in the following manner. As previously discussed, the liquid crystal light valve 12 is maintained at a constant temperature in the temperature chamber 52 which temperature is a few degrees below the smectic A-nematic phase transition. Thus, since the liquid crystal light valve 12 is cooled in the aforementioned manner after being addressed by the laser beam, there is provided a permanent memory in the light valve 12 by the randomly oriented liquid crystal molecules of the image addressed by the laser beam. This memory established by the randomly oriented liquid crystal molecules can be erased by applying an AC bias across the indium tin oxide electrodes 42A and 42B by an AC power source 46 as shown in FIG. 2.

After the liquid crystal light valve 12 is laser addressed in the aforementioned manner, the image memorized by the light valve 12 may be projected to expose a photosensitive material stationed at the film plane 38 in accordance with the following description. The incoherent light from the projection lamp 60 is focused by the condenser lenses 62 to the plane of the X scanning mirror 24 from whence it is projected into the full aperture of the telecentric lens 30 to produce a collimated beam of white incoherent light which is modulated by the laser addressed liquid crystal light valve 12 as it is transmitted therethrough. The shutter 66 operates to accurately time the duration of the exposure by controlling the time during which the light from the projection lamp 60 is transmitted to the light valve 12. As is readily apparent, this projection mode occurs after the liquid crystal light valve 12 has been fully addressed by the laser diode 16 and is ready to be imaged onto the film plane 38 through one of the three colored filters of the filter wheel 32. In addition it will be readily understood that the Y and X scanning mirrors 22 and 24 are moved during the projection mode of operation to positions which would operate to project the incoherent beam centrally along the optical axis as shown at $O_A$.

The incoherent projection light transmitted through the liquid crystal light valve 12 is thereafter filtered by one of the red, green or blue filters in the filter wheel 32 and thereafter imaged onto the film plane 38 by the projection lens 34 to expose a photosensitive material stationed thereon in a well-known manner. The aperture defining plate 36 allows non-scattered light from the liquid crystal light valve 12 to pass through the aperture to the film plane 38 while blocking scattered light from the randomly oriented areas of the liquid crystal light valve 12 so as to effectively increase the contrast of the image on the film. The projection lens 34 could alternatively have a zoom capability to accommodate the exposure of different film formats. As will be readily understood, three consecutive exposures, one through each of the red, green and blue filter elements, are made in the aforementiond manner to provide the full color exposure.

Referring now to FIG. 3 where like numerals designate previously-described elements, there is shown an alternate arrangement for the electronic color film printer of this invention wherein a photograph may be first scanned and thereafter duplicated in the following manner. The photograph to be scanned for subsequent copying is first stationed at the film plane 38 and a pair of white light read lamps 86 and 88 are utilized to uniformly illuminate the photograph to be scanned. Alternatively, as will be readily understood, a transparency could be scanned at the film plane 38 in place of the photograph as long as means were provided to back illuminate the transparency. The image defining light reflected from the photograph at the film plane 38 is projected by a zoom lens 84 by way of a field lens 82 to an object plane 80. The reflected image defining light from the photograph at the film plane 38 is thereafter transmitted through an appropriate one of the red, green and blue filters and a pair of telecentric lenses 68 and 70 having an aperture defining plate 78 disposed therebetween. The reflected image defining light is thereafter transmitted through the liquid crystal light valve 12 and projected by the telecentric lens 30 onto the X scanning mirror 24 from which it is reflected to the Y scanning mirror 26. The Y and X scanning galvanometers 26 and 28 are driven in the aforementioned manner to provide a two dimensional scan of the entire area of the liquid crystal light valve 12. The image defining reflected light is thereafter reflected by the Y scanning mirror 22 to a dichroic beam splitter 92 from whence it is reflected to a photodetector 90 to provide an electronic signal corresponding to the image of the scanned photograph. The output from the photodetector 90 is thereafter amplified by a detector amplifier circuit 94 and directed by the microcomputer 54 for conversion into either a digital or analog format. The image data may be stored in an appropriate memory (not shown) or may be enhanced in any well-known manner to improve the quality of the image to be subsequently photocopied.

Copying the original photograph may be accomplished by replacing the original photograph at the film plane 38 with a photosensitive film after the read lamps 86 and 88 have been turned off. Image data which as previously discussed may be enhanced is directed by the microcomputer 54 to modulate the light intensity of the laser beam output from the Ga-Al-As laser diode 16. The laser beam is directed in the aforementioned manner through the beam shaping prisms 18 and 20 from whence it is transmitted through the dichroic beam splitter 92 to impinge upon the Y scanning mirror 22. The laser beam is thereafter reflected from the Y scanning mirror 22 to the X scanning mirror 24 from whence it is focused by the telecentric lens 30 to the surface of the liquid crystal light valve 12. The Y and X scanning galvanometers 26 and 28 operate in the aforementioned manner to scan the laser beam across the entire two-dimensional area of the liquid crystal light valve 12 so as to fully address the light valve.

Once the liquid crystal light valve 12 has been fully addressed by the laser diode 16, it is ready to be imaged onto the film plane to expose the photosensitive material through one of the three red, green and blue filters of the filter wheel 32. The shutter 66 thus controls the exposure time of the exposure lamp 60 which produces a collimated beam of incoherent white light in the aforementioned manner to uniformly illuminate the entire area of the liquid crystal light valve 12. The incoherent white projection light is modulated by the liquid crystal light valve 12 as it passes therethrough and is subsequently imaged to expose the photosensitive material on the film plane 38 by way of the two back-to-back telecentric lenses 68 and 70, the aperture plate 78, the field lens 82 and the zoom lens 84. The back-to-back telecentric lenses 68 and 70 operate to improve the contrast ratio by also reducing off-axis non-uniformity. Thus, in this manner can a photograph be line scanned by way of the same liquid crystal light valve 12 and YX scanning mirrors 22 and 24 that are subsequently used to expose a reproduction thereof.

As is readily apparent, a slide transparency can also be sensed in the foregoing manner by placing the slide transparency at the object plane 80 and utilizing the zoom lens 84 to project back illumination from the read lamps 86 and 88 reflected by the film plane 38. After the slide transparency is scanned in the aforementioned manner, the image data can be appropriately manipulated by the microcomputer 54 to provide a dodging exposure of a photosensitive film stationed at the film plane 38 while the original slide transparency is held in place at the object plane 80. Thus, the liquid crystal light valve 12 is addressed in the aforementioned manner with the light from the laser diode 16 being modulated in conformity with the selected dodging algorithm. The addressed liquid crystal light valve 12 is thereafter projected in the aforementioned manner by the projection lamp 60 and its associated shutter 66 onto the back of the slide transparency so as to back illuminate the slide transparency with the appropriate dodging illumination. The slide transparency so illuminated is, in turn, projected onto the photosensitive film stationed at the film plane 38 by the zoom lens 84 to appropriately expose an enhanced reproduction of the original slide transparency.

The electronic color film printer of this invention utilizes a single set of YX scanning mirrors 22 and 24 to both scan a photograph or a slide transparency to derive image data corresponding thereto and to thereafter address the entire two-dimensional area of a liquid crystal light valve as a function of the image data, and to project a collimated illuminating beam of incoherent light for transmission and modulation by the liquid crystal light valve. The use of the Y and X scanning mirrors to transmit the projection light subsequent to the light valve being addressed by the laser beam facilitates an economical and practical arrangement of the optical elements making possible the scanning of an original photograph and the addressing of the light valve to expose a reproduction thereof with a single pair of XY scanning mirrors.

The electronic color film printer herein described may be useful for providing high resolution photocopies in the order of 2,048×2,048 pixels in a reasonable time with acceptable contrast. In addition, it can back illuminate a slide transparency with the appropriate dodging illumination to expose an enhanced image duplicate thereof. In addition, the electronic color film printer can expose different size film formats such as 3×3, 4×5, 8×11, etc. The digitized and computer stored image data can be marshalled with enhancing algorithms before being addressably loaded into the liquid crystal light valve 12 to provide enhanced image reproductions.

Other embodiments of the invention, including additions, subtractions, deletions, and other modifications of the preferred disclosed embodiments of the invention will be obvious to those skilled in the art and are within the scope of the following claims.

What is claimed is:

1. An electronic image printer of the type adapted to expose a photosensitive material with light derived from a source of incoherent light to print an image on the photosensitive material of a selected subject comprising:
   laser means for providing a beam of coherent light;
   means for modulating said coherent light beam in response to an electronic signal corresponding to the image of the subject selected for printing;
   a laser addressed liquid crystal light valve;
   light scanning means including at least one light reflective scanning surface for sweeping said modulated coherent light beam over the area of said liquid crystal light valve so as to address said liquid crystal light valve;
   first optical means for focusing the light emanating from the source of incoherent light onto said light reflective scanning surface for projection by said light scanning means to uniformly illuminate the entire area of said liquid crystal light valve previously addressed by said beam of coherent light; and
   second optical means for directing the incoherent light transmitted through said liquid crystal light valve to expose the photosensitive material to the image of the subject selected for printing.

2. The apparatus of claim 1 wherein said light scanning means comprises a telecentric lens disposed in light transmitting relationship between said light reflective scanning surface and said laser addressed liquid crystal light valve.

3. The apparatus of claim 1 wherein said light scanning means comprises two light reflective scanning surfaces for sweeping said coherent light beam in mutually orthogonal directions, one of said light reflective scanning surfaces operating to reflect said coherent light beam to the other of said reflective scanning surfaces from whence said coherent light beam is reflected to said liquid crystal light valve and said first optical means operates to focus the light emanating from the source of incoherent light onto said other reflective scanning surface.

4. The apparatus of claim 3 wherein said first optical means comprises a condenser lens system for focusing the light emanating from the source of incoherent light onto said other reflective scanning surface.

5. The apparatus of claim 3 wherein said second optical means comprises a projection lens, means for defining a select aperture and means for sequentially moving red, green and blue filter elements into optical alignment with respect to said projection lens.

6. An electronic image sensing and printing apparatus of the type adapted to sense an image of a subject selected for printing and expose a photosensitive material with light derived from a source of incoherent light to print an image on the photosensitive material of the subject so selected comprising:
   a laser addressed liquid crystal light valve;
   first optical means for projecting an image of the subject so selected onto the area of the liquid crystal light valve;
   a photoresponsive element for providing an electrical output signal in correspondence with the intensity of light incident thereto;
   light scanning means including at least one light reflective scanning surface for sweeping over the area of said liquid crystal to direct a beam of image defining light therefrom to said photoresponsive element;
   laser means for providing a beam of coherent light;
   means for modulating said coherent light beam in response to said electrical output signal from said photoresponsive element, said light scanning means thereafter operating to sweep said modulated coherent light beam over the area of said liquid crystal light valve so as to address said liquid crystal light valve; and
   second optical means for directing the light emanating from the source of incoherent light to uniformly illuminate the entire area of said liquid crystal light valve previously addressed by said beam of coherent light, said first optical means operating to direct the incoherent light transmitted through said liquid crystal light valve to expose the photosensitive material to the image of the subject.

7. The apparatus of claim 6 wherein said second optical means operates to focus the light emanating from the source of incoherent light onto said light reflective scanning surface for projection by said light scanning means to uniformly illuminate the entire area of said liquid crystal light valve.

8. The apparatus of claim 7 wherein said light scanning means comprises a telecentric lens disposed in light transmitting relationship between said light reflective scanning surface and said laser addressed liquid crystal light valve.

9. The apparatus of claim 7 wherein said light scanning means comprises two reflective scanning surfaces for sweeping the image defining light beam and the coherent light beam in mutually orthogonal directions, one of said light reflective scanning surfaces operating to reflect the image defining beam from said liquid crystal to the other of said reflective scanning surfaces from whence the image defining beam is reflected to said photoresponsive element, said other light reflective scanning surface also operating to reflect the coherent light beam to said one reflective scanning surface from whence said coherent light beam is reflected to said liquid crystal light valve ahd said first optical means operates to focus the light emanating from the source of incoherent light onto said one reflective scanning surface.

10. The apparatus of claim 9 including a beam splitting optical element for directing a beam of image defining light received from said other light reflective scanning surface to said photoresponsive element and for receiving said beam of coherent light from said laser means and directing said received beam of coherent light to said other light reflective scanning surfaces.

11. The apparatus of claim 10 wherein said second optical means comprises a condenser lens system for focusing the light emanating from the source of incoherent light onto said one reflective scanning surface.

12. The apparatus of claim 9 wherein said first optical means comprises spaced apart telecentric lenses, means for defining a select aperture between said telecentric lenses, and means for sequentially moving red, green and blue filter elements into optical alignment with respect to said projection lens.

13. The apparatus of claim 12 wherein said first optical means further comprises a field lens and a zoom lens in optical alignment with respect to said telecentric lens, said zoom lens defining an object plane at which a slide transparency may be stationed either for image scanning, image exposure or image dodging.

* * * * *